United States Patent
Tashiro et al.

(10) Patent No.: US 9,389,128 B2
(45) Date of Patent: Jul. 12, 2016

(54) TEMPERATURE DETECTION DEVICE

(71) Applicant: DENSO CORPORATION, Kariya, Aichi-pref. (JP)

(72) Inventors: Makoto Tashiro, Toyota (JP); Hiroki Marubayashi, Obu (JP)

(73) Assignee: DENSO CORPORATION, Kariya (JP)

( * ) Notice: Subject to any disclaimer, the term of this patent is extended or adjusted under 35 U.S.C. 154(b) by 428 days.

(21) Appl. No.: 14/091,597

(22) Filed: Nov. 27, 2013

(65) Prior Publication Data

US 2014/0219316 A1    Aug. 7, 2014

(30) Foreign Application Priority Data

Feb. 6, 2013  (JP) .................... 2013-21357

(51) Int. Cl.
G01K 7/16   (2006.01)
G01K 15/00  (2006.01)
G01K 7/22   (2006.01)

(52) U.S. Cl.
CPC .............. *G01K 7/22* (2013.01); *G01K 2205/04* (2013.01)

(58) Field of Classification Search
USPC ...................................................... 374/183, 1
See application file for complete search history.

(56) References Cited

U.S. PATENT DOCUMENTS

| | | | | |
|---|---|---|---|---|
| 5,140,302 A * | 8/1992 | Hara | ................. | G07C 5/08 327/512 |
| 5,350,237 A * | 9/1994 | Hida | .................. | G01K 15/00 236/49.3 |
| 6,048,094 A * | 4/2000 | Tornare | ................. | G01K 7/25 307/116 |
| 8,727,616 B2 * | 5/2014 | Snowdon | ................. | G01K 7/22 327/512 |
| 2009/0196326 A1 * | 8/2009 | Tsukude | ................. | G01K 3/005 374/176 |
| 2009/0237142 A1 * | 9/2009 | Matsuda | ................. | H02J 7/0091 327/512 |
| 2014/0241398 A1 * | 8/2014 | Snowdon | ................. | G01K 7/22 374/183 |

FOREIGN PATENT DOCUMENTS

| | | |
|---|---|---|
| JP | 05-113373 A | 5/1993 |
| JP | H07-159251 A | 6/1995 |
| JP | 2003-294483 A | 10/2003 |
| JP | 2007-101207 A | 4/2007 |
| JP | 2009-250613 A | 10/2009 |
| JP | 2010-112924 A | 5/2010 |
| JP | 2011-075530 A | 4/2011 |
| JP | 2011-204163 A | 10/2011 |
| JP | 2011-213255 A | 10/2011 |

OTHER PUBLICATIONS

Office Action mailed Jan. 27, 2015 issued in corresponding JP patent application No. 2013-021357 (and English translation).

* cited by examiner

*Primary Examiner* — Mirellys Jagan
(74) *Attorney, Agent, or Firm* — Posz Law Group, PLC

(57) ABSTRACT

A temperature detection device is connected to a temperature sensor, and includes two resistors, a transistor and a microcomputer. The temperature sensor is connected to ground. The resistors are connected in series between the temperature sensor and a power supply line. The transistor is connected to the resistor, which is at the power supply line side. The microcomputer switches over a characteristic of a sensor voltage, which is developed at a junction between the resistor and the temperature sensor, to a first characteristic and a second characteristic by switching over the transistor to an on-state and an off-state. The microcomputer calculates a temperature based on the sensor voltage. When the transistor is in the on-state, the microcomputer detects a voltage developed at a lowpotential side output terminal of the transistor and calculates the temperature based on the transistor output voltage and the sensor voltage.

7 Claims, 6 Drawing Sheets

TEMPERATURE DETECTION DEVICE

CROSS REFERENCE TO RELATED APPLICATION

The present application relates to and incorporates herein by reference Japanese patent application No. 2013-21357 filed on Feb. 6, 2013.

FIELD

The present disclosure relates to a temperature detection device using a temperature sensor, which varies its resistance value in accordance with temperature.

BACKGROUND

In a temperature detection device of this type, a pull-up resistor is provided between a power supply voltage line and one end of a temperature sensor, the other end of which is connected to a ground line, thereby to develop at a junction between the resistor and the temperature sensor a sensor voltage, which corresponds to a resistance value of the temperature sensor and hence to a temperature of a detection object. The temperature detection device detects the sensor voltage and calculates the temperature of the detection object based on a detection value of the sensor voltage.

Further, according to a temperature detection device disclosed in JP-A-2009-250613, two series resistors are provided as pull-up a resistor and two output terminals of a transistor are connected to both ends of one resistor of the two series resistors provided at a power supply voltage line side. In this temperature detection device, the transistor is switched over to turn on and off to vary the resistance value of the pull-up resistor. Thus a temperature-voltage characteristic of the sensor voltage relative to temperature is switched over between a first temperature-voltage characteristic and second temperature-voltage characteristic. With this configuration, failure of the temperature sensor can be detected surely and accuracy of temperature detection can be improved.

According to the conventional temperature detection device, it is not assumed that the voltage developed between the output terminals of the transistor in the on-state varies with aging deterioration and temperature. For this reason, accuracy of temperature detection is lowered in a state that the transistor is in the on-state.

SUMMARY

It is therefore an object to improve accuracy of temperature detection.

According to one aspect, a temperature detection device is provided for a temperature sensor, which is connected to a reference potential line at a low-potential side end thereof and varies resistance thereof with temperature of a detection object. The temperature detection device comprises plural resistors, a transistor and a computer. The plural resistors includes a first resistor and a second resistor, which are connected in series between a high-potential side end of the temperature sensor and a power supply line of a potential higher than the reference potential. The transistor has two output terminals connected to both ends of the second resistor, which is provided at the power supply line side than the first resistor, which is connected to a high-potential side end of the temperature sensor. The computer includes a switch section and a detection section. The switch section switches over a characteristic of a sensor voltage, which is developed at a junction between the first resistor and the temperature sensor, relative to temperature between a first characteristic and a second characteristic by switching over an on-state and an off-state of the transistor. The detection section detects the sensor voltage and calculates the temperature based on the sensor voltage. When the transistor is in the on-state, the detection section detects a transistor output voltage developed at an output terminal, which is a low-potential side of the two output terminals of the transistor, and calculates the temperature based on the transistor output voltage and the sensor voltage.

EMBODIMENT OF THE DISCLOSURE

Embodiments of a temperature detection device will be described below.

First Embodiment

Figure 1:
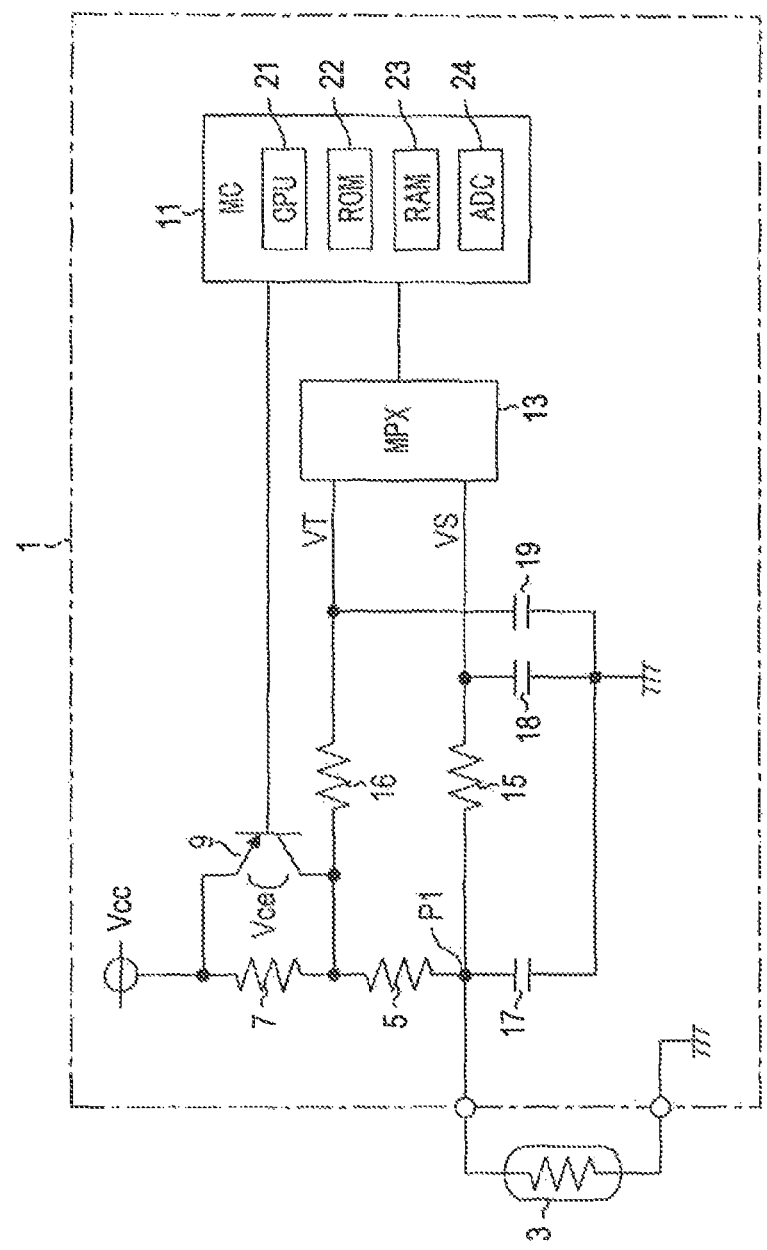
FIG. 1 is a circuit diagram showing a first embodiment of a temperature detection device.

As shown in FIG. 1, a temperature detection device 1 according to a first embodiment is connected to a temperature sensor 3 and includes a first resistor (simply referred to as a resistor below) 5, a second resistor (simply referred to as a resistor) 7, a transistor (TR) 9, a microcomputer (MC, simply referred to as a computer below) 11 and a multiplexer (MPX) 13. A low-potential side end of the temperature sensor 3 is connected to a ground potential line (=0V) as a reference potential. A high-potential side end of the first resistor 5 is connected to the other end of the temperature sensor 3. The resistor 7 is connected between the high-potential side end of the first resistor 5 and a power supply line of a voltage Vcc. Two output terminals of the transistor 9 are connected to both ends of the second resistor 7.

The temperature sensor 3 is a thermistor, which varies its resistance value in accordance with temperature of a detection object. It has a temperature characteristic (that is, negative temperature characteristic), in which a resistance value decreases as temperature rises. The temperature sensor 3 is provided in an exhaust pipe of an engine mounted in an automotive vehicle, for example, to detect exhaust temperature of the engine as temperature of a detection object. The temperature sensor 3 may be a different type of sensor, which has a temperature characteristic (that is, positive temperature characteristic), in which a resistance value increases as temperature rises.

The power supply line supplies a constant voltage Vcc, which is 5V. However it may be a voltage other than 5V. The transistor 9 is a PNP transistor. A collector of the transistor 9 is connected to a low-potential side end of the resistor 7 (end at the resistor 5 side). An emitter of the transistor 9 is connected to a high-potential side end of the resistor 7 (end at the power supply line side). The transistor 9 may be any one of a NPN transistor and transistors other than bipolar transistors.

A sensor voltage VS, which is developed at a junction P1 between the first resistor 5 and the temperature sensor 3, is inputted to the multiplexer 13 through a resistor 15. The resistor 15 forms a noise filter jointly with a capacitor 18, one end of which is connected to the ground potential line. A capacitor 17 for noise removal is connected between the junction P1 and the ground potential line.

A voltage (referred to as a transistor output voltage below) VT developed at a collector, which is a low-potential side output terminal of two output terminals (collector and emitter) of the transistor 9, is inputted also to the multiplexer 13 through a resistor 16. The resistor 16 forms a noise filter jointly with a capacitor 19, one end of which is connected to the ground potential line.

The multiplexer 13 selects one of the sensor voltage VS and the transistor output voltage VT, which are inputted thereto, in response to an instruction from the computer 11 and outputs it to the computer 11. The computer 11 includes a CPU 21 for executing programs, a ROM 22 storing programs to be executed and fixed data, a RAM 23 for storing arithmetic operation results of the CPU 21 and an A/D converter (ADC) 24.

The computer 11 acquires each of the sensor voltage VS and the transistor output voltage VT selected by the multiplexer 13 and detects each voltage VS, VT (specifically voltage value of each voltage VS, VT) by A/D conversion of the same.

The temperature sensor 3 is pulled up to the power supply line through the resistors 5 and 7, which are connected in series, when the transistor 9 is in the off-state. The temperature sensor 3 is pulled up to the power supply line through the transistor 9 and the resistor 5 when the transistor 9 is in the on-state.

Assuming that resistance values of the temperature sensor 3, the resistor 5 and the resistor 7 are RS, R5 and R7, respectively, the sensor voltage VS becomes a voltage, which is a division of the power supply voltage Vcc by RS and R5+R7, as expressed by the following equation (1), when the transistor 9 is in the off-state.

$$VS = Vcc \times RS/(RS+R5+R7) \quad (1)$$

RS is expressed by the following equation (2) by conversion of the equation (1).

$$RS = VS \times (R5+R7)/(Vcc-VS) \quad (2)$$

The sensor voltage VS is a voltage, which is a division of the transistor output voltage VT by RS and R5, as expressed by the following equation (3), when the transistor 9 is in the on-state.

$$VS = VT \times RS/(RS+R5) \quad (3)$$

RS is expressed by the following equation (4) by conversion of the equation (3).

$$RS = VS \times R5/(VT-VS) \quad (4)$$

The sensor voltage VS thus varies with the resistance value RS of the temperature sensor 3 and hence with the temperature of the detection object. The characteristics of variation in the resistance value relative to temperature T differ between the off-state and the on-state of the transistor 9. The computer 11 switches over the on-state and the off-state of the transistor 9 by controlling a base current of the transistor 9 so that the characteristic of a voltage VS relative to temperature is switched between a first temperature-voltage characteristic (simply referred to as a first characteristic) and a second temperature-voltage characteristic (simply referred to a second characteristic).

Figure 2:
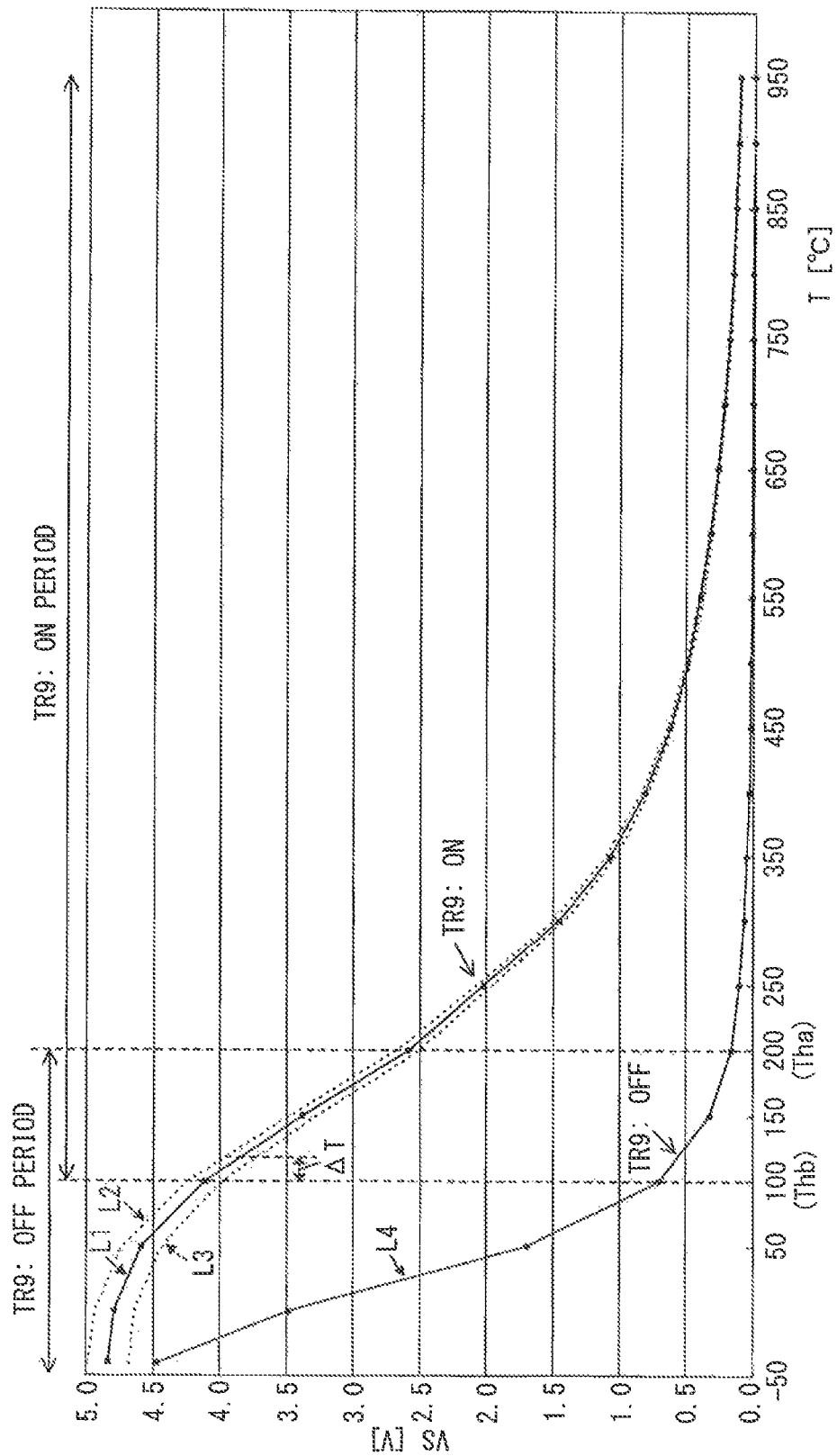
FIG. 2 is a graph showing one example of a temperature-voltage characteristic of a sensor voltage relative to temperature.

The resistances of the resistors 5 and 7 are so set that the characteristics of the sensor voltage VS relative to temperature is the first characteristic shown by a line L1 and the second characteristic shown by a line L4 in FIG. 2 when the transistor 9 is in the on-state and the off-state, respectively. For example, the resistance value R5 of the resistor 5 and the resistance value R7 of the resistor 7 are set to 6.0 kΩ and 200 kΩ, respectively.

In FIG. 2, the characteristic shown by a line L2 is a characteristic, which indicates that sensor voltage VS varies to a maximum side due to variation of a collector-emitter voltage (voltage between output terminals) Vce of the transistor 9 to a minimum side in the on-state of the transistor 9. In FIG. 2, the characteristic shown by a line L3 is a characteristic, which indicates that sensor voltage VS varies to a minimum side due to variation of the collector-emitter voltage Vce of the transistor 9 to a maximum side in the on-state of the transistor 9.

Since the resistance value RS of the temperature sensor 3 decreases as temperature rises, the sensor voltage VS decreases as temperature rises as shown in FIG. 2. The resistance values of the resistors 5 and 7 are so set that, as shown in FIG. 2, the sensor voltage VS varies generally in a linear characteristic in a high temperature range above 100° C., for example, when the transistor 9 is in the on-state.

When the transistor 9 is in the off-state, the second resistor 7 operates as a pull-up resistor. The sensor voltage VS thus becomes lower over all temperature ranges as shown in FIG. 2 in comparison to a case that the transistor 9 is in the on-state. Accordingly, the sensor voltage VS rises close to 5V at a maximum when the transistor 9 is in the on-state but the sensor voltage VS rises only to about 4.5V at a maximum when the transistor is in the off-state. In addition, the resistance values of the resistors 5 and 7 are so set that, as shown in FIG. 2, the sensor voltage VS varies generally in a linear characteristic in a low temperature range below 200° C., for example, when the transistor 9 is in the off-state.

The computer 11 calculates the resistance value RS of the temperature sensor 3 by using at least the detection value of the sensor voltage VS and calculates the temperature of the detection object by matching the calculated resistance value RS with a resistance-temperature conversion map stored in the ROM 22, which defines a relation between resistance value RS and temperature. That is, the calculated resistance value RS is converted into the temperature.

The computer 11 turns on and off the transistor 9 to set the characteristic of the sensor voltage VS relative to temperature to the first characteristic and the second characteristic when temperature is high and low, respectively. By thus switching over the characteristics, the sensor voltage VS is caused to vary approximately linearly over all temperature ranges so that accuracy of temperature detection is improved.

When the temperature sensor 3 breaks, the sensor voltage VS becomes equal to 5V same as the sensor voltage VS irrespective of temperature. When the transistor 9 is maintained in the on-state with the temperature sensor 3 being normal, the sensor voltage VS rises close to 5V as shown by the line L1 or L2 in FIG. 2.

It is therefore not possible to check whether the temperature sensor 3 is normal or broken based on the sensor voltage VS under low temperature condition, if the transistor 9 is maintained in the on-state. The computer 11 however turns off the transistor 9 in the low temperature condition, the sensor voltage VS rises only up to about 4.5V at a maximum as shown by the line L4 in FIG. 2 if the temperature sensor 3 is normal. It is therefore possible to check whether the temperature sensor 3 is normal or broken based on the sensor voltage VS.

If the characteristic of the sensor voltage VS relative to temperature is fixed to the characteristic indicated by the line L4 (second characteristic) in FIG. 2, it is possible to detect a breakage (disconnection) of the temperature sensor 3 over all temperature range. However, since an amount of variation of the sensor voltage VS relative to temperature becomes small in a high temperature range, the accuracy of temperature detection (resolving power of detection) is lowered. Accordingly, the characteristic of the sensor voltage VS relative to temperature is switched over by turning on and off the transistor 9. As a result, in all temperature ranges, the accuracy of temperature detection is improved and detection of disconnection of the temperature sensor 3 is enabled.

When the transistor 9 is in the on-state, the resistance value RS of the temperature sensor 3 can be calculated by the equation 4. The transistor output voltage VT used in the equation (4) is lower than the power supply line Vcc by the collector-emitter voltage Vce of the transistor 9. Assuming that the collector-emitter voltage Vce is constant, it is possible to calculate the resistance value RS of the temperature sensor 3 by setting the transistor output voltage VT as a constant value in the equation (4).

However the collector-emitter voltage Vce actually varies in correspondence to aging, temperature and the like of the transistor 9. Assuming that the collector-emitter voltage Vce varies between 0V and 0.3V, the sensor voltage VS varies between the maximum and the minimum, which are shown by the lines L2 and L3 in FIG. 2, respectively, at the same temperature.

Thus even if the sensor voltage VS is the same, temperature varies actually. For example, as indicated by an arrow of ΔT in FIG. 2, the temperature indicated by the sensor voltage VS varies about 20° C. in a temperature range near 100° C. even if the sensor voltage VS is the same 4V.

Therefore, when the transistor 9 is in the on-state, the computer 11 detects not only the sensor voltage VS but also the actual transistor output voltage VT and calculates the resistance value RS of the temperature sensor 3 by using both of the detected transistor output voltage VT and the sensor voltage VS. Thus accuracy of temperature detection is improved.

Operation processing, which the computer 11 executes, will be described with reference to FIG. 3 and FIG. 4. The operation processing executed by the computer 11 is realized by execution of the programs stored in the ROM 22 by the CPU 21. The computer 11 executes temperature detection processing shown in FIG. 3 at every predetermined fixed time interval after starting its operation with the power supply to the temperature detection device 1. For example, power supply to the temperature detection device 1 is started when an ignition switch in an automotive vehicle is turned on. The computer 11 includes a switch section and a temperature detection section as described below. The computer 11 initially turns off the transistor 9 upon starting its operation. That is, the initial operation-state of the transistor 9 is the off-state. The initial operation-state of the transistor 9 may alternatively be the on-state.

Figure 3:
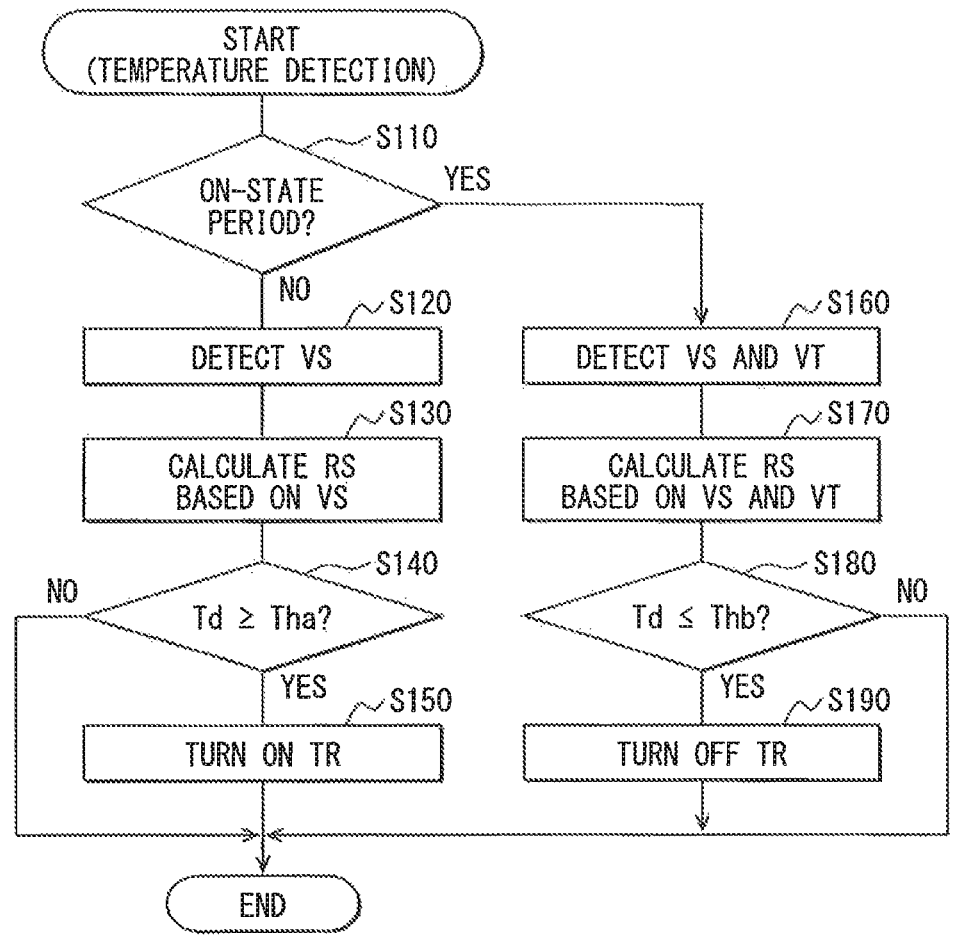
FIG. 3 is a flowchart showing temperature detection processing.

As shown in FIG. 3, after starting the temperature detection processing, the computer 11 checks at S110 whether it is in an on-state period of the transistor 9 (that is, the transistor 9 is in the on-state).

When it is not in the on-state period of the transistor 9 (that is, it is in the off-state period of the transistor 9), the computer 11 detects the sensor voltage VS at S120. Specifically, the computer 11 causes the multiplexer 13 to output the sensor voltage VS and A/D converts the sensor voltage VS.

At next S130, by substituting the sensor voltage VS detected at S120 into the equation (2), the computer 11 calculates the resistance value RS of the temperature sensor 3 and calculates the temperature of the detection object by matching the calculated RS value with the resistance-temperature conversion map. In the equation (2), R5, R7 and Vcc are set to fixed values, which are known. The calculated temperature is referred to as detected temperature Td.

At next S140, the computer 11 checks whether the detected temperature Td calculated at S130 is equal to or higher than a first threshold value Tha. The computer 11 finishes the temperature detection processing, if the detected temperature Td is not equal to or higher than the first threshold value Tha. The computer 11 turns on the transistor 9 from the off-state at S150 and finishes the temperature detection processing, if the detected temperature Td is equal to or higher than the first threshold value Tha.

The first threshold value Tha is a threshold value for switching over the characteristic of the sensor voltage VS relative to temperature from the second characteristic for low temperature detection to the first characteristic for high temperature detection. It is set at 200° C. for example.

When the computer 11 determines at S110 that it is the on-state period of the transistor 9, the computer 11 executes S160 to detect both of the sensor voltage VS and the transistor output voltage VT. Specifically, the computer 11 causes the multiplexer 13 to output the sensor voltage VS and A/D converts the sensor voltage VS. The computer 11 further causes the multiplexer 13 to output the transistor output voltage VT and A/D converts the transistor output voltage VT.

At next S170, by substituting the sensor voltage VS and the transistor output voltage VT detected at S160 into the equation (4), the computer 11 calculates the resistance value RS of the temperature sensor 3 and calculates the temperature of the detection object by matching the calculated RS value with the resistance-temperature conversion map. In the equation (4), R5 is set to a fixed value, which is known.

At next S180, the computer 11 checks whether the detected temperature Td calculated at S170 is equal to or lower than a second threshold value Thb. The computer 11 finishes the temperature detection processing, if the detected temperature is not equal to or lower than the second threshold value Thb. The computer 11 turns off the transistor 9 from the on-state at S190 and finishes the temperature detection processing, if the detected temperature is equal to or lower than the second threshold value Thb.

The second threshold value Thb is a threshold value for switching over the characteristic of the sensor voltage VS relative to temperature from the first characteristic to the second characteristic. The second threshold value Thb is lower than the first threshold value Tha and it is set at 100° C. for example (refer to FIG. 2). That is, a hysteresis is provided at a switch-over point between the first characteristic and the second characteristic. Thus when the temperature near the switch-over point is detected, it is prevented that the switch-over of characteristics hunts.

Figure 4:
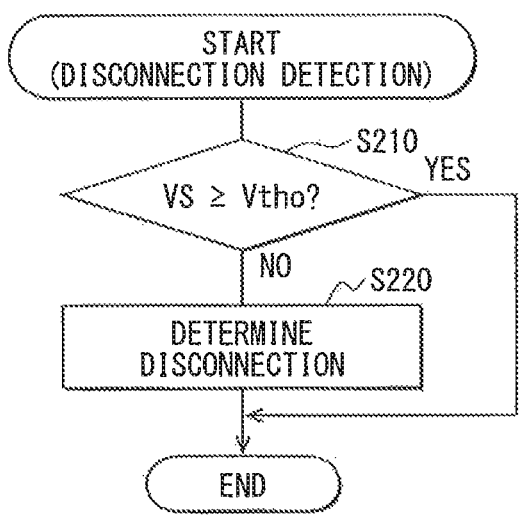
FIG. 4 is a flowchart showing disconnection detection processing.

The computer 11 further executes disconnection detection processing shown in FIG. 4 at a predetermined fixed time interval, for example, as processing for detecting disconnection of the temperature sensor 1. The computer 11 thus includes a disconnection detection section. As shown in FIG. 4, the computer 11 detects at S210 the sensor voltage VS after starting the disconnection detection processing. The computer 11 then checks whether the detected sensor voltage VS is equal to or higher than a disconnection reference value Vth0. If the sensor voltage VS is not equal to or higher than the disconnection reference value Vth0, the computer 11 finishes the disconnection detection processing. If the sensor voltage VS is equal to or higher than the disconnection reference value Vtho, the computer 11 executes S220. At S220, by determining that the temperature sensor 3 has disconnection, the computer 11 stores in the RAM 23 or a non-volatile memory (not shown) failure information, which indicates the disconnection in the temperature sensor 3, for example. The computer 3 executes in addition or alternatively processing of activating a warning light, which indicates an abnormality of the temperature sensor 3. The computer 11 then finishes the disconnection detection processing.

The disconnection reference value Vth0 is set to be higher than a maximum value of the sensor voltage VS, which is developed when the temperature sensor 3 is normal, and lower than 5V.

In the first embodiment, since the transistor 9 is turned off in the temperature range below 100° C., the maximum value of the sensor voltage VS produced when the transistor 9 is in the off-state is higher than the maximum value of the sensor voltage VS produced when the transistor 9 is in the on-state as shown in FIG. 2. The maximum value of the sensor voltage VS produced when the temperature sensor 3 is normal is the maximum value (4.5V) of the sensor voltage VS produced when the transistor 9 is in the off-state. For this reason, the disconnection reference value Vth0 is set to a value (for example, 4.8V), which is higher than 4.5V and lower than 5V.

In the first embodiment, the computer 11 detects not only the sensor voltage VS but also the transistor output voltage VT when the transistor 9 is in the on-state, and calculates the resistance value of the temperature sensor 3 (and hence temperature of the detection object) based on the detected transistor output voltage VT and the detected sensor voltage VS. Since the power supply line Vcc is known, detection of the transistor output voltage VT and use of the same for temperature calculation corresponds to detection of the collector-emitter voltage Vce of the transistor 9 and use of the same for temperature calculation.

In the first embodiment, the accuracy of temperature detection is not lowered even when the collector-emitter voltage Vce of the transistor 9 varies. That is, the accuracy of temperature detection is improved.

In a case that a heater of an A/F (air/fuel ratio) sensor provided in an exhaust pipe is controlled based on a detected temperature, for example, the heater control can be performed with higher accuracy because of higher accuracy of temperature detection.

Second Embodiment

A temperature detection device according to a second embodiment will be described next. In this embodiment, the temperature detection device is designated with the same reference numeral "1." Same structural parts and processing as in the first embodiment will also be designated with the same reference numerals used in the first embodiment. This is also true for other embodiments, which will be descried below.

Figure 5:
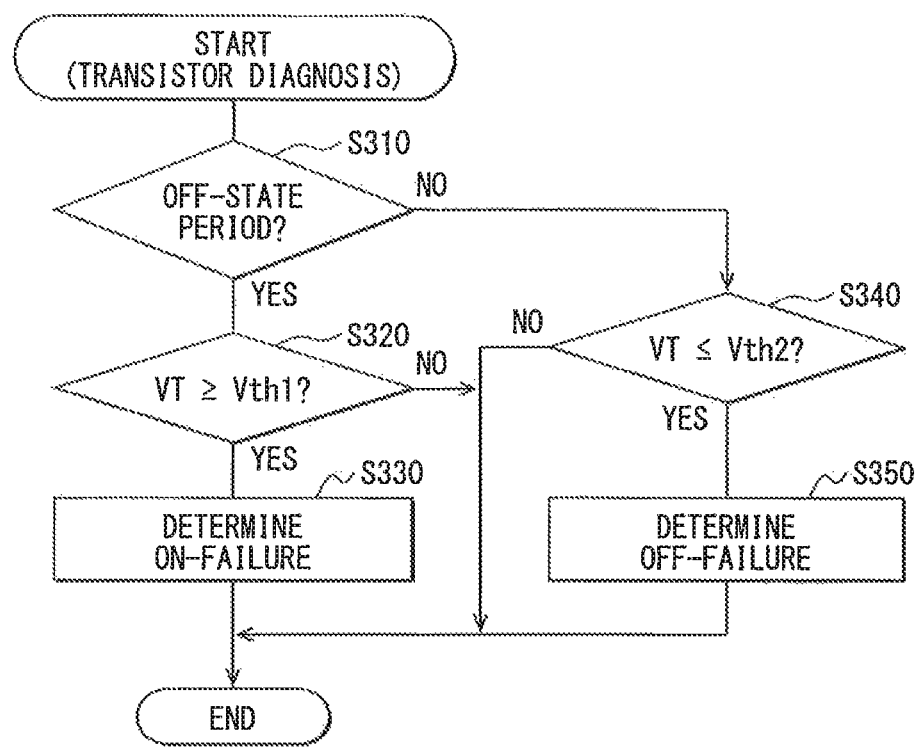
FIG. 5 is a flowchart showing transistor diagnosis processing executed in a second embodiment.

In the temperature detection device 1 according to the second embodiment, in comparison with the first embodiment, the computer 11 executes transistor diagnosis processing shown in FIG. 5 at every predetermined fixed time interval. The fixed time interval for executing the transistor diagnosis processing may be shorter, longer or the same in comparison with that of the temperature detection processing. The computer 11 thus includes a transistor diagnosis section, more specifically an on-failure detection section and an off-failure detection section as described below.

As shown in FIG. 5, after starting the transistor diagnosis processing, the computer 11 checks at S130 whether it is in the off-state period of the transistor 9 (that is, the transistor 9 is in the off-state).

If it is in the off-state period of the transistor 9, the computer 11, at S320, detects the transistor output voltage VT and checks whether the detected transistor output voltage VT is equal to or higher than an on-failure reference value Vth1.

If it is determined at S320 that the transistor output voltage VT is not equal to or higher than the on-failure reference value Vth1, the computer 11 finishes the transistor diagnosis processing. If it is determined that the transistor output voltage VT is equal to or higher than the on-failure reference value Vth1, the computer 11 executes S330.

The computer 11, determining that the transistor 9 has the on-failure, stores in the RAM 23 or a non-volatile memory (not shown) failure information, which indicates that the transistor 9 has the on-failure or activates the warning light for indicating an occurrence of abnormality. The on-failure means that the transistor 9 cannot be switched over to the off-state and is a short-circuit failure. Then the computer 11 finishes the transistor diagnosis processing.

If the computer determines at S310 that it is not in the off-state period of the transistor 9 (that is, it is in the on-state period), the computer 11 executes S340. The computer 11 detects at S340 the transistor output voltage VT and checks whether the detected transistor output voltage VT is equal to or lower than an off-failure reference value Vth2.

If it is determined at S340 that the transistor output voltage VT is not equal to or lower than the off-failure reference value Vth2, the computer 11 finishes the transistor diagnosis processing. If it is determined that the transistor output voltage VT is equal to or lower than the off-failure reference value Vth2, the computer 11 executes S350.

The computer 11, determining that the transistor 9 has the off-failure, stores in the RAM 23 or a non-volatile memory (not shown) failure information, which indicates that the transistor 9 has the off-failure or activates the warning light for indicating an occurrence of abnormality. The off-failure means that the transistor 9 cannot be switched over to the on-state and is an open-circuit failure. Then the computer 11 finishes the transistor diagnosis processing.

Figure 6:
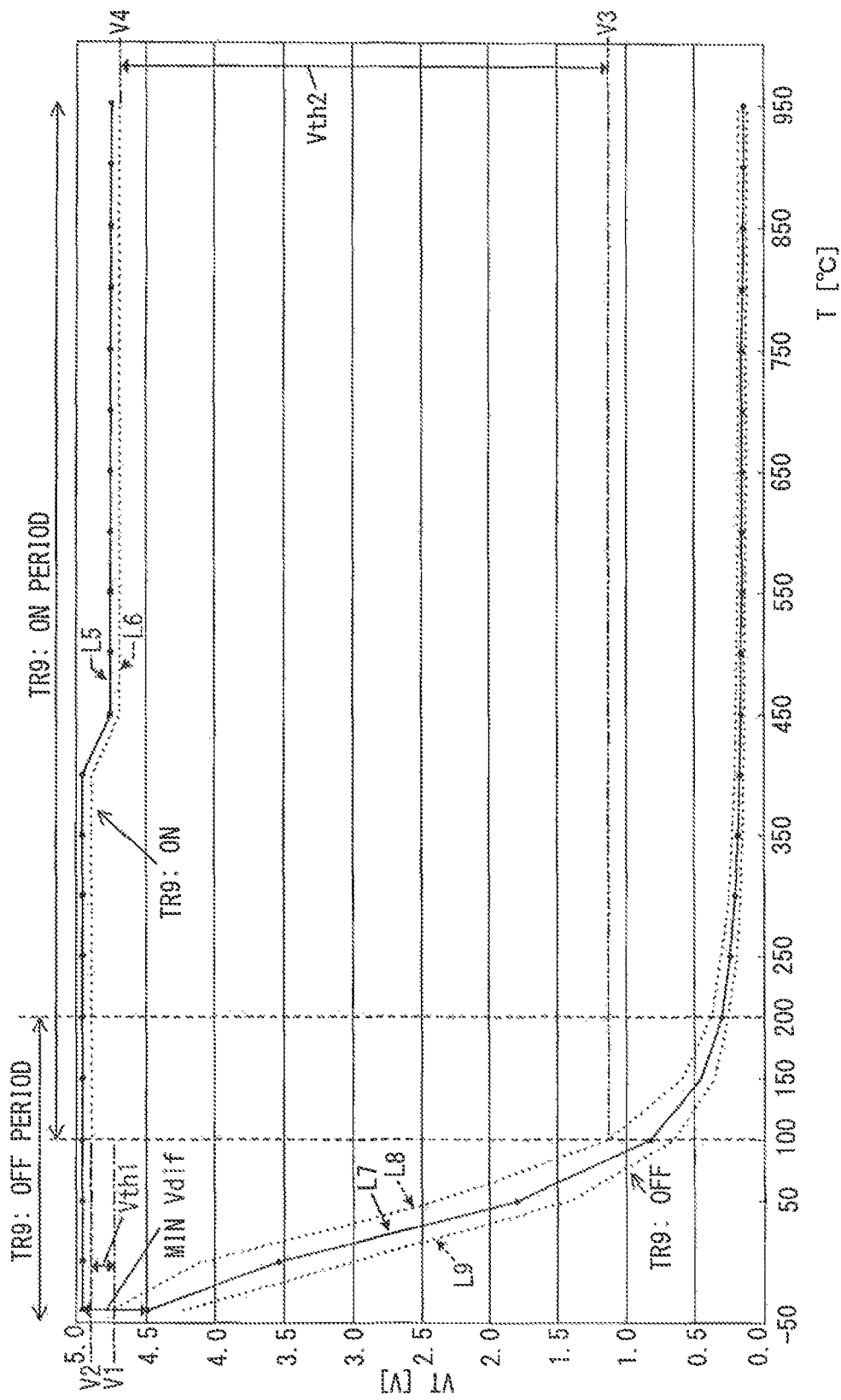
FIG. 6 is an explanatory diagram showing a setting range among an on-failure reference value, an off-failure reference value and an abnormality reference value of a transistor.

The on-failure reference value Vth1 and the off-failure reference value Vth2 will be described below with reference to FIG. 6. In FIG. 6, lines L5 and L6 show relations of the transistor output voltage VT and temperature T of the detection object when the transistor 9 is in the on-state. The line L5 indicates a typical value (standard value) of the transistor output voltage VT The line L6 indicates a minimum value of the transistor output voltage VT.

In FIG. 6, lines L7 to L9 show relations of the transistor output voltage VT and temperature of the detection object when the transistor 9 is in the off-state. The line L7 indicates a typical value of the transistor output voltage VT. The lines L8 and L9 indicate a maximum value and a minimum value of the transistor output voltage VT of the transistor output voltage VT, respectively.

The minimum values of the transistor output voltages VT indicated by the lines L6 and L9 are values produced when the transistor output voltage VT varies to the minimum value side due to variations in characteristics of structural elements forming a detection circuit and surrounding temperatures of the circuit. The maximum value of the transistor output voltages VT indicated by the line L8 is a value produced when the transistor output voltage VT varies to the maximum value side due to variations in characteristics of structural elements forming the detection circuit and surrounding temperatures of the circuit. Near the middle part in FIG. 6, that is, in a temperature range of 400° C. to 450° C., the lines L5 and L6 sharply fall. This is because the surrounding temperature of the transistor 9 is assumed to rise as the temperature of the detection object rises and the collector-emitter voltage Vce of the transistor 9 has the positive temperature characteristic. The lines L5 and L6 are shown as falling sharply near the middle part of FIG. 6 only for illustration reason, although they actually falls more gently as the temperature of the detection object rises.

The on-failure reference value Vth1 is set to be higher than V1 shown in FIG. 6 and lower than V2 shown in FIG. 6. V1 is a maximum value of VT in a case that the transistor 9 is normal (that is, in the off-state) in the off-state period of the transistor 9. V2 is a minimum value of VT in a case that the transistor 9 is abnormal (that is, in the on-state) in the off-state period of the transistor 9. It is thus possible to determine that the transistor 9 has the on-failure, if the transistor output voltage VT is equal to or higher than the on-failure reference value Vth1 in the off-state period of the transistor 9.

The off-failure reference value Vth2 is set to be higher than V3 shown in FIG. 6 and lower than V4 shown in FIG. 6. V3 is a maximum value of VT in a case that the transistor 9 is abnormal (that is, in the off-state) in the on-state period of the transistor 9. V4 is a minimum value of VT in a case that the transistor 9 is normal (that is, in the on-state) in the on-state period of the transistor 9. It is thus possible to determine that the transistor 9 has the off-failure, if the transistor output voltage VT is equal to or lower than the off-failure reference value Vth2 in the on-state period of the transistor 9.

According to the second embodiment, it is possible to detect the abnormality of the transistor 9 by distinguishing the on-failure and the off-failure. Since it is possible to confirm whether the transistor 9 is normal or abnormal, the accuracy of the sensor voltage VS can be confirmed. When the transistor 9 is detected to be abnormal (on-failure or off-failure), it is possible to avoid acquisition of erroneous temperature detection result by executing fail-safe processing such as stopping a temperature detection operation.

Third Embodiment

Figure 7:
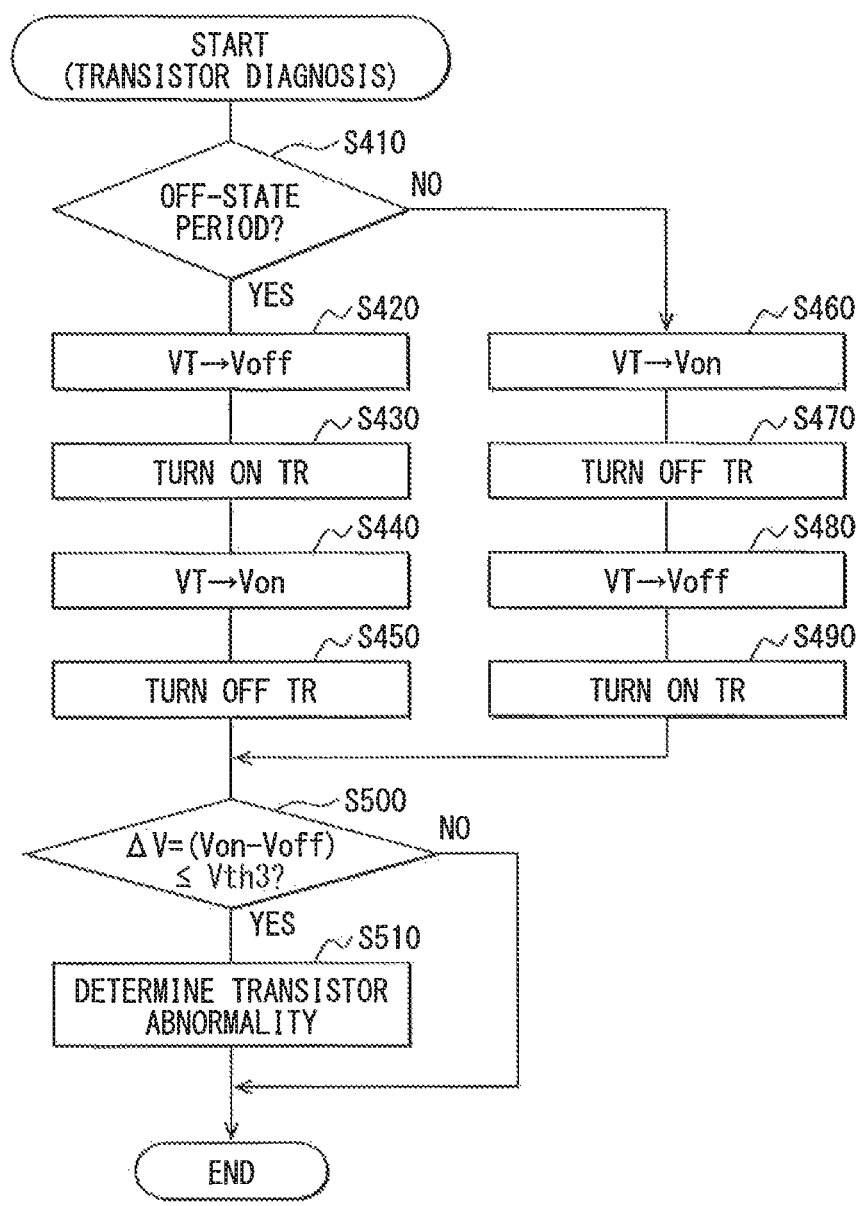
FIG. 7 is a flowchart showing transistor diagnosis processing executed in a third embodiment.

In the temperature detection device 1 according to a third embodiment, in comparison to the second embodiment, the computer 11 executes transistor abnormality detection processing shown in FIG. 7 in place of the transistor diagnosis processing shown in FIG. 5. The computer 11 thus includes a transistor abnormality detection section.

As shown in FIG. 7, after starting the transistor diagnosis processing, the computer 11 checks at S410 whether it is in the off-state period of the transistor 9. If it is in the off-state period of the transistor 9, the computer 9, at S420, detects the transistor output voltage VT and stores the detected transistor output voltage VT as Voff. Voff is the transistor output voltage VT produced when the transistor 9 is in the off-state.

The computer 11 turns on the transistor 9 at S430. Then at S440 the computer 11 detects the transistor output voltage VT and stores the detected transistor output voltage VT as Von. Von is the transistor output voltage VT produced when the transistor 9 is in the on-state.

The computer 11 then turns off the transistor 9 at S450. That is, the computer 11 controls the transistor 9 to the same state as before starting the transistor diagnosis processing. That is, the computer 11 controls the transistor 11 to resume the previous state. The computer 11 then executes S500.

If the computer 11 determines at S410 that it is not in the off-state period of the transistor 9 (that is, it is in the on-state period), the computer 11 executes S460. The computer 11, at S460, detects the transistor output voltage VT and stores the detected transistor output voltage VT as Von.

The computer 11 turns off the transistor 9 at S470. Then at S480 the computer 11 detects the transistor output voltage VT and stores the detected transistor output voltage VT as Voff.

The computer 11 turns on the transistor 9 at S490. That is, the computer 11 controls the transistor 9 to the same state as before starting the transistor diagnosis processing. The computer 11 then executes S500.

At S500, the computer 11 calculates a voltage difference $\Delta V$ (=Von−Voff) between voltages Von and Voff and checks whether the difference $\Delta V$ is equal to or smaller than an abnormality reference value Vth3. If the difference $\Delta V$ is determined to be not equal to or smaller than the abnormality reference value Vth3, the computer 11 finishes the transistor diagnosis processing. If the difference $\Delta V$ is determined to be equal to or smaller than the abnormality reference value Vth3, the computer executes S510.

The computer 11 determines at S510 that the transistor 9 has an abnormality. The computer 9 stores failure information, which indicates that the transistor 9 is abnormal, in the RAM 23 or the non-volatile memory (not shown). The computer 11 in addition or alternatively activates the warning light to indicate abnormality. The computer 11 thereafter finishes the transistor diagnosis processing.

That is, in the transistor diagnosis processing, the transistor 9 is switched over between the on-state and the off-state and the difference $\Delta V$ between the voltages VT, one and the other of which are produced when the transistor is switched to the on-state and the off-state, respectively. It is checked whether the difference $\Delta V$ is equal to or smaller than the abnormality reference value Vth3. If the difference $\Delta V$ is equal to or smaller than the abnormality reference value Vth3, it is determined that the transistor 9 does not switch over its states and is abnormal.

The abnormality reference value Vth3 will be described with reference to FIG. 6. Assuming that the voltage difference between the transistor output voltages VT produced in the on-state and the off-state of the transistor 9 is Vdif, the abnormality reference value Vth3 is set to be a value smaller than a minimum value of Vdif.

In the third embodiment, as shown by the line L7 in FIG. 6, the transistor output voltage VT produced in the off-state of the transistor 9 varies largely relative to the temperature of the detection object and is higher as the temperature of the detection object is lower. However, as shown by the line L5 in FIG. 6, the transistor output voltage VT does not vary so much in the on-state of the transistor 9.

For this reason, Vdif becomes a minimum when the temperature of the detection object is the lowest (in this example, −50° C.) in a detection range. For example, as sown in FIG. 6, when the temperature of the detection object is −50° C., the transistor output voltage VT in the off-state of the transistor 9 is 4.5V and the transistor output voltage VT in the on-state of the transistor 9 is 4.9V. As a result, the minimum value of Vdif is 0.4V (4.9V-4.5V) and hence the abnormality reference value Vth3 is set to be a value (for example, 0.3V) smaller than 0.4V.

Here, the voltages VT of the transistor 9 in the on-state and the off-state of the transistor 9 both varies in the same increasing and decreasing directions relative to the typical value indicated by the lines L5, L7. The minimum value of Vdif may be considered relative to the typical value of the transistor output voltage VT.

That is, in the transistor diagnosis processing in the third embodiment, it is not possible to detect the on-failure and the off-failure of the transistor 9 separately. It is however possible to set the abnormality reference value Vth3 without taking into consideration variations of characteristics and temperature characteristics of elements forming a detection circuit. For this reason, design work for setting the abnormality reference value Vth3 is simpler in comparison to setting of the on-failure reference value Vth1 in the transistor diagnosis processing in the second embodiment, for example. Accordingly, in the third embodiment, the design work is simplified. Further the abnormality of the transistor 9 can be detected over all temperature ranges.

It is noted that any one the transistor diagnosis processing of the third embodiment (FIG. 7) and the transistor diagnosis processing of the second embodiment (FIG. 5) may be used as the case may be. For example, if it is necessary to detect a failure mode of the transistor 9 separately, the transistor diagnosis processing of the second embodiment may be implemented. If it is preferred to detect the abnormality of the transistor 9 over all temperature ranges, the transistor diagnosis processing of the third embodiment may be implemented.

As an example of modification, in a case that the transistor 9 is determined to be abnormal by the computer 11, it is possible to check whether the failure mode of the transistor 9 is the on-failure or the off-failure by executing the transistor diagnosis processing of FIG. 5. In a case that the transistor 9 is determined to have either one of the on-failure or the off-state failure by the transistor diagnosis processing, it is possible to check whether the transistor 9 is actually abnormal by executing the transistor diagnosis processing of FIG. 7.

The temperature detection device is described above with reference to plural embodiments. The temperature detection device is not limited to such embodiments but may be implemented differently as other embodiments.

For example, other pull-up resistors may be connected between the power supply line and the second resistor 7. Either one or both of the resistors 5 an 7 may be formed of a series of plural resistors. The plural resistors are considered to form one resistor. The reference potential may be a potential different from the ground potential. The temperature sensor 3 may be other than a thermistor as far as such a temperature sensor is capable of varying a resistance value thereof with temperature. The temperature of the detection object may be any temperature other than the exhaust temperature of the engine.

Of the structures and processing of the above-described embodiments, some parts may be combined differently, eliminated or modified. For example, the transistor diagnosis processing may be eliminated.

What is claimed is:

1. A temperature detection device for a temperature sensor, which is connected to a reference potential line at a low-potential side end thereof and varies resistance thereof with temperature of a detection object, the temperature detection device comprising:
plural resistors including a first resistor and a second resistor, which are connected in series between a high-potential side end of the temperature sensor and a power supply line of a potential higher than the reference potential;
a transistor having two output terminals connected to both ends of the second resistor, which is provided at the power supply line side than the first resistor, which is connected to a high-potential side end of the temperature sensor; and
a computer including a switch section and a detection section, the switch section switching over a characteristic of a sensor voltage, which is developed at a junction between the first resistor and the temperature sensor, relative to temperature between a first characteristic and a second characteristic by switching over an on-state and an off-state of the transistor, and the detection section detecting the sensor voltage and calculating the temperature based on the sensor voltage,
wherein, when the transistor is in the on-state, the detection section detects a transistor output voltage developed at an output terminal, which is a low-potential side of the two output terminals of the transistor, and calculates the temperature based on the transistor output voltage and the sensor voltage.

2. The temperature detection device according to claim 1, wherein the computer further includes:
an abnormality detection section for detecting a difference between the transistor output voltages produced when the transistor is turned on and turned off, checking whether the difference is equal to or smaller than an abnormality reference value, and determining that the transistor is abnormal when the difference is equal to or lower than the abnormality reference value.

3. The temperature detection device according to claim 1, wherein the computer further includes:
an on-failure detection section for checking whether the transistor output voltage is equal to or higher than an on-failure reference value when the switch element controls the transistor to the off-state, and determining that the transistor has an on-failure when the transistor output voltage is equal to or higher than the on-failure reference value.

4. The temperature detection device according to claim 3, wherein the computer further includes:
an abnormality detection section for detecting a difference between the transistor output voltages produced when the transistor is turned on and turned off, checking whether the difference is equal to or smaller than an abnormality reference value, and determining that the transistor is abnormal when the difference is equal to or lower than the abnormality reference value.

5. The temperature detection device according to claim 1, wherein the computer further includes:
an off-failure detection section for checking whether the transistor output voltage is equal to or lower than an off-failure reference value when the switch section controls the transistor to the on-state, and determining that the transistor has an off-failure when the transistor output voltage is equal to or lower than the off-failure reference value.

6. The temperature detection device according to claim 5, wherein the computer further includes:
an on-failure detection section for checking whether the transistor output voltage is equal to or higher than an on-failure reference value when the switch element controls the transistor to the off-state, and determining that the transistor has an on-failure when the transistor output voltage is equal to or higher than the on-failure reference value.

7. The temperature detection device according to claim 5, wherein the computer further includes:

an abnormality detection section for detecting a difference between the transistor output voltages produced when the transistor is turned on and turned off, checking whether the difference is equal to or smaller than an abnormality reference value, and determining that the transistor is abnormal when the difference is equal to or lower than the abnormality reference value.

* * * * *